Feb. 12, 1946.                B. EDELMAN ET AL                    2,394,599
                            ARTICLE FEEDING APPARATUS
                            Filed April 28, 1942            4 Sheets-Sheet 4
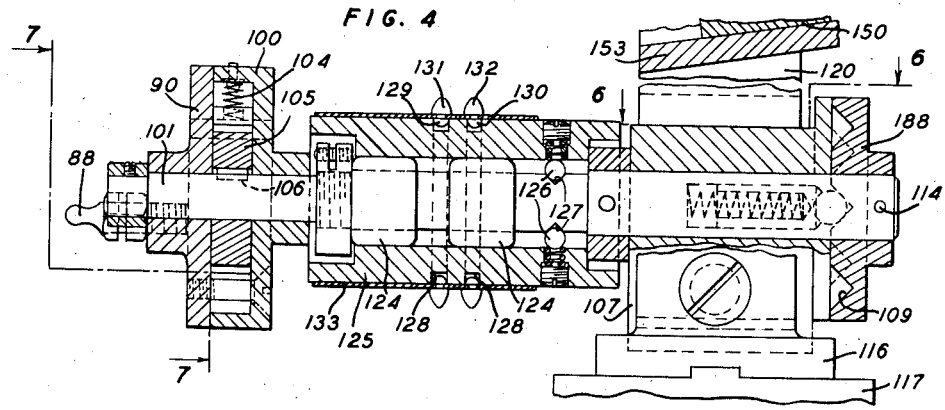
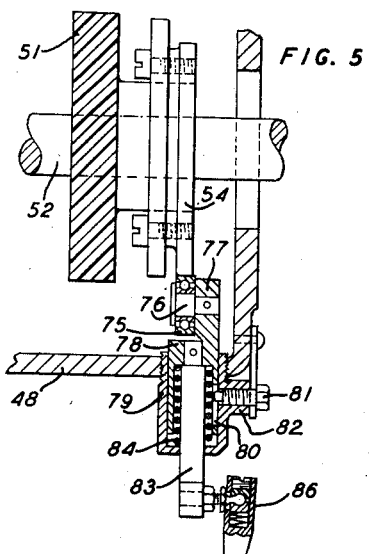
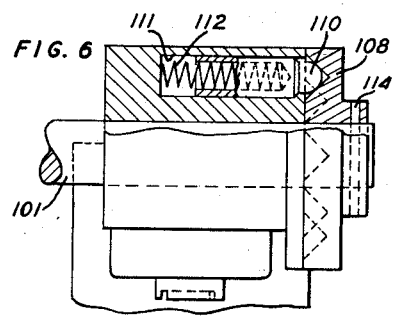
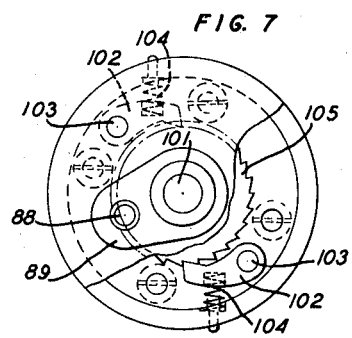
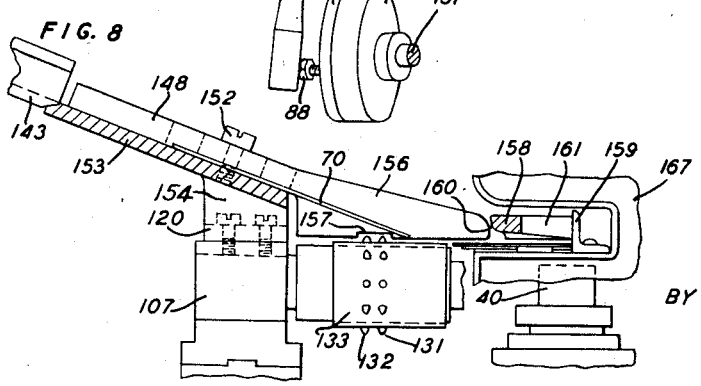
INVENTORS
B. EDELMAN
A.L. PIZZI
BY
E.R. Nowlan
ATTORNEY Patented Feb. 12, 1946

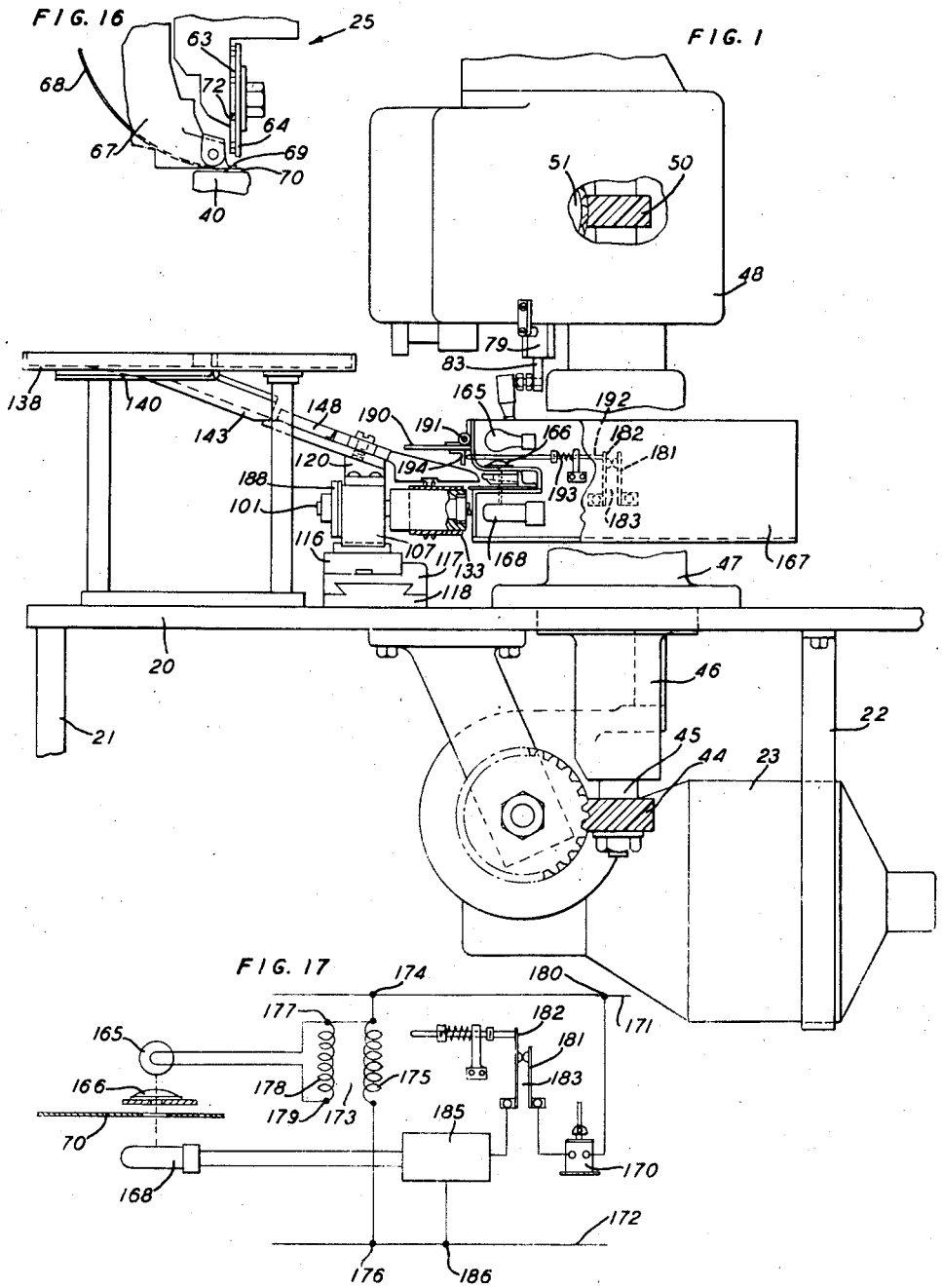

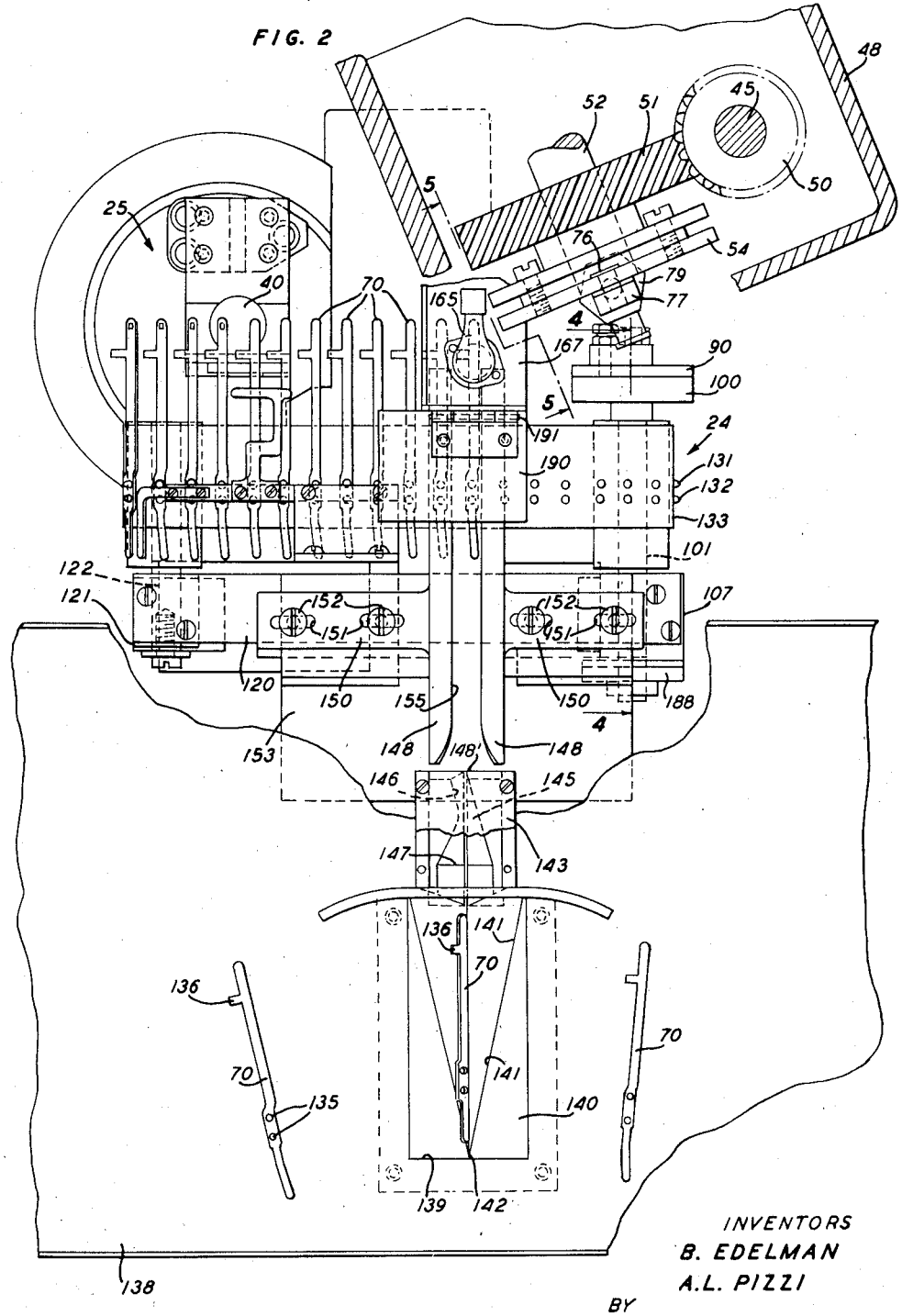

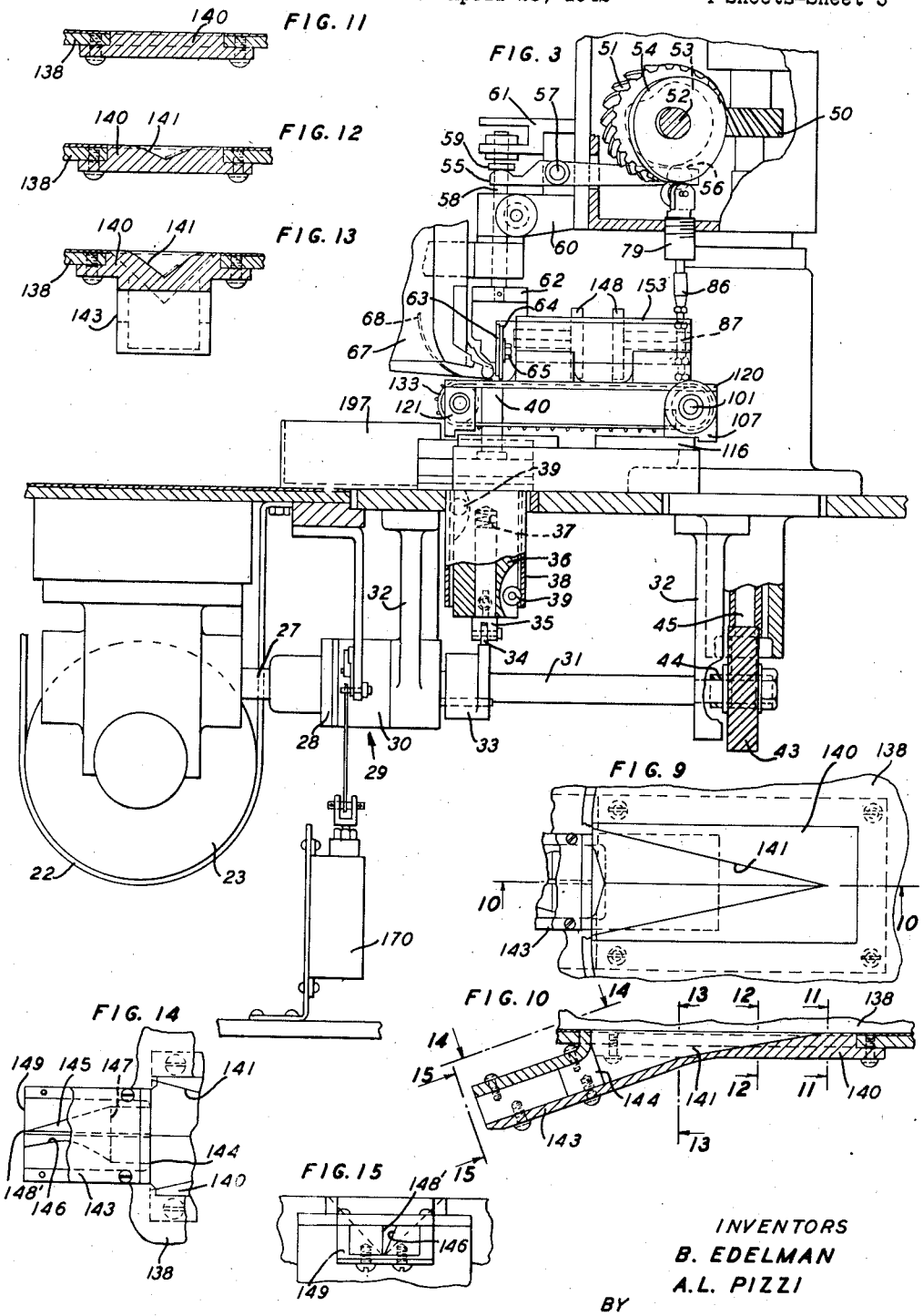

2,394,599

UNITED STATES PATENT OFFICE 2,394,599

ARTICLE FEEDING APPARATUS

Beril Edelman, Brooklyn, N. Y., and Albert L. Pizzi, Newark, N. J., assignors to Western Electric Company, Incorporated, New York, N. Y., a corporation of New York Application April 28, 1942, Serial No. 440,826

7 Claims. (Cl. 219—4)

This invention relates to article feeding apparatus, and more particularly to apparatus for feeding small parts to welding machines.

In the manufacture of small articles or parts the ultimate cost thereof may vary depending upon the speed and accuracy in which the various steps of the manufacturing process, in each instance, are carried out. If certain of these steps include the manual feeding of the articles to a machine and the manual removal of such from the machine, then the maximum output of the machine depends largely on the efficiency of the operator. Therefore, the reduction of the time required for the feeding of the articles or parts to the machine and the assurance of accuracy in the feeding of such to the machine would not only reduce the physical strain on the operator to a minimum but would increase the efficiency of the machine to a maximum.

An object of the invention is to provide an apparatus for feeding articles in accurate and variable positions.

With this and other objects in view, the invention comprises a unit operable to move articles at predetermined spaced positions intermittently to a machine adapted to perform work on the articles, a chute structure to receive the articles and formed to orient the articles singly in accurate positions for mounting on the unit, the accurately mounted articles affecting a mechanism to cause operation of the machine and intermittent movement of the unit to advance the articles to the machine.

Other objects and advantages will be apparent from the following detailed description when considered in conjunction with the accompanying drawings, wherein:

Fig. 1 is a side elevational view of the apparatus;

Fig. 2 is an enlarged fragmentary top plan view of the apparatus shown in conjunction with a welding machine, portions of the apparatus being shown in section;

Fig. 3 is a vertical sectional view of the apparatus shown in combination with the welding machine;

Fig. 4 is an enlarged fragmentary sectional view taken substantially along the line 4—4 of Fig. 2;

Fig. 5 is a fragmentary sectional view taken substantially along the line 5—5 of Fig. 2;

Fig. 6 is a fragmentary sectional view taken substantially along the line 6—6 of Fig. 4;

Fig. 7 is an end elevational view taken substantially along the line 7—7 of Fig. 4, a portion thereof being shown in section;

Fig. 8 is a fragmentary sectional view of a portion of the feeding chute;

Fig. 9 is a fragmentary top plan view of the entrance end of the feeding chute;

Fig. 10 is a fragmentary sectional view taken along the line 10—10 of Fig. 9;

Fig. 11 is a fragmentary sectional view taken along the line 11—11 of Fig. 10;

Fig. 12 is a fragmentary sectional view taken along the line 12—12 of Fig. 10;

Fig. 13 is a fragmentary sectional view taken along the line 13—13 of Fig. 10;

Fig. 14 is a fragmentary sectional view taken along the line 14—14 of Fig. 10;

Fig. 15 is a fragmentary detailed view taken along the line 15—15 of Fig. 10;

Fig. 16 is a fragmentary front elevational view illustrating the wire feeding means and electrodes of the machine, and Fig. 17 is a wiring diagram illustrating the electrical circuits functioning in the operation of the feeding unit and the machine.

Referring now to the drawings, attention is first directed to Figs. 1, 2 and 3. A suitable support 20 mounted upon legs 21, only one of which is shown in Fig. 1, has a suspending bracket 22 for supporting a motor 23. The motor 23 provides the power for moving an advancing unit, indicated generally at 24, and for operating a machine indicated generally at 25. The motor 23 when operating drives a shaft 27, supporting at the end thereof a part 28 of a one-revolution clutch indicated generally at 29. The other part, 30, of the clutch is mounted upon the adjacent end of a shaft 31 in axial alignment with the shaft 27 and supported by brackets 32, the brackets being mounted on the under surface of the support 20. A cam 33 is keyed to the shaft 31 and is so formed that during each cycle of rotation of the shaft 31 it will move a cam roller 34, which is positioned to ride thereon, upwardly a predetermined distance and hold the roller at this position for a given length of time. The roller 34 is carried by a rod 35 which rides vertically in a centrally apertured member 36 against the force of a spring 37, the latter serving as a cushioning means between the rod and the member. The member 36 is free to move in a sleeve 38 through the aid of rollers 39, the sleeve extending through the support 20 and carried thereby. The member 36 supports an anvil or a lower electrode 40 at its upper end, this completing the lower portion of the mechanism of the welding machine, the other portion thereof being hereinafter described.

Returning now to the shaft 31, it will be noted that in Figs. 1 and 3 a spiral gear 43 is mounted upon the end thereof, this gear interengaging a spiral gear 44 of a shaft 45. The shaft 45 is journalled in suitable bearings (not shown) disposed in housings 46, 47 and 48 suitably supported by the support 25, as illustrated in Figs. 1 and 3. A spiral gear 50 is mounted on the shaft 45 in the housing 48, this gear interengaging a spiral gear 51 which is supported by a shaft 52, the latter being rotatably supported in suitable bearings (not shown). On the shaft 52, upon opposite sides of the gear 51, are cams 53 and 54.

Considering first the cam 53, this cam is formed to cause actuation of a cam lever 55 through its engagement with a roller 56 supported by the lever. The lever 55 is pivotally supported at 57 and its forward end opposite the roller 56 is in the shape of a yoke adapted to straddle a rod 58 and support a collar 59 which is fixed to the rod. The rod 58 is suitably journalled in brackets 60 and 61 for reciprocable movement therein through the action of the lever 55. A head 62 is fixed to the lower end of the rod 58 and adjustably supports an electrode wheel 63 and a stop 64 through the aid of a screw 65. Attention is momentarily directed to Fig. 16, which is an enlarged view of this portion of the machine. In this view a fragmentary portion of a feeding and cutting mechanism is illustrated at 67. The detailed structure of this mechanism is not believed necessary for a clear understanding of the invention, the purpose of this structure being to feed a flat wire 68 intermittently and to cut predetermined lengths thereon to form contact portions 69 which are to be welded onto articles 70, the latter, in the present instance, being contact springs (Fig. 2). During each cycle of operation of the apparatus and machine a contact portion 69 is severed from the wire 68 and located on the article 70 which has been moved above the anvil 40 in vertical alignment with the electrode 63. During the feeding of the wire 68 and the cutting of the contact 69 therefrom, the electrode 63 and the anvil 40 are in their closed positions so that the stop 64 may function. The full welding pressure is, however, not applied until after the completion of the cutting operation. The electrode is of the circular type and is provided with notches 72 to partially receive the contacts singly in one of the notches during each welding operation.

In returning now to the cam 54, attention is directed to Figs. 2, 3 and 5. The cam 54 is formed to cause a predetermined movement of a roller 75 during each cycle of rotation of the cam. The roller 75 is supported by a shaft 76 carried by a vertical projection 77 of a hollow member 78, the latter being movably disposed in a cup 79 extending through a wall of the housing 48 and threadedly mounted therein. An elongate slot 80 in the member 78 receives the reduced end of a screw 81 threadedly disposed in an embossed portion 82 of the cup 79, to maintain the member 78 movable in a given direction and against rotation. A rod 83 extends upwardly through an opening in the lower end of the cup 79 and into the member 78, where its upper end is fixed as illustrated in Fig. 5. A spring 84, disposed in the member 78 concentric with the rod 83, normally urges the member upwardly to maintain the roller 75 in engagement with the cam 54. A swivel connecting means, indicated at 86, operatively connects the rod 83 with an adjustable link 87, a similar swivel connection 88 being provided to operatively connect the other end of the link with a lever 89. The lever 89 is fixed to or, as in the present embodiment, formed integral with a face plate 90 of a ratchet unit 100, all of which are disposed concentric with a shaft 101.

The ratchet unit includes a set of pawls 102 mounted on their pivotal supports 103 and normally urged inwardly by their respective springs 104. The pawls are disposed at diametrically opposed positions for engagement with teeth of a ratchet 105, the latter being keyed to the shaft 101 as at 106 (Fig. 4). Therefore, during actuation of the mechanism under the control of the cam 54, a rocking motion is imparted to the unit, and through the pawls 102 and the ratchet 105 intermittent rotary motion is imparted to the shaft 101. The shaft 101 has variations in its contours throughout its length but extends through a bearing 107 and supports at its opposite end a control element 108. The control element is provided with a circular arrangement of equally spaced recesses 109 adapted to singly receive a holding member 110, of the contour illustrated in Fig. 6, which is movably disposed in an aperture 111 in the bearing 107 and normally urged toward the element 108 by a spring 112. The element 108 is fixed to the end of the shaft 101 by a pin 114 and, through the intermittent rotation of the shaft, the element 108 is moved the distance of one recess, this element with the member 110 functioning to hold the shaft against rotation in an opposite direction during the return movement of the unit 100 through its associated mechanism.

The bearing 107 is mounted upon a plate 116 which in turn is mounted upon an adjustable slide 117 (Figs. 1 and 4), the latter being adjustably supported on a plate 118, the adjustment being possible through any suitable means not shown. The slide 117 also supports a plate 120 (Fig. 2) to support a bearing 121 for a shaft 122. The shaft 122 is mounted in a position parallel with the shaft 101 and is similar in contour except shorter in length, in that it is not provided with an element 108 at one end and a ratchet mechanism 100 at the other. On each shaft there are mounted bearings 124 to support a pulley 125 of the contour shown in Fig. 4. Spring pressed ball members 126 disposed at diametrically opposed positions in the pulley on shaft 101 and receivable in recesses 127 in the shaft, provide the means for operatively connecting this pulley to its shaft. The pulley on the shaft 122 is mounted for free rotation as there is no need of a driving connection with its shaft. With this structure damage to the mechanism is eliminated as a result of article or articles accidentally jamming, in that anything preventing rotation of the pulleys will render the connecting means, that is the spring pressed ball members, ineffective to hold the pulleys for movement with their shafts. As shown in Fig. 4, the pulleys are provided with annular grooves 128 to receive inner heads 130 of sets of locating pins or elements 131. This structure functions to maintain accurate positioning of a belt 133 on the pulleys, the locating elements 131 of each set being carried thereby at equally spaced positions, as illustrated in Fig. 2, by the belt.

Attention at this time is directed to the article 70 to be fed to the advancing unit 24. In the present embodiment the article 70 is one form of contact spring having mounting apertures 135 at spaced positions in one portion thereof adapted to receive the locating elements 131 of the belt 133. In the present illustration the spring 70 is provided with an integral projection 136 near the end thereof which is to receive the contact 69 at the welding unit 25. The contact 69 must, however, be welded on a definite side of the spring 70, and for this reason the location of the spring on the belt 133 is of great importance. Therefore, a feed controlling means illustrated in Figs. 1, 2 and 8 to 15 inclusive is provided. This means includes a table 138 upon which a supply of the articles or springs may be disposed. Near the center of the table 138 an opening 139 is provided to receive the entrance end of a chute 140 secured in place as illustrated in Figs. 2, 9 and 10. The chute includes a groove 141 which begins at a point 142 and becomes wider and deeper as it advances toward an orienting unit 143. The cross sectional contours of the chute are illustrated in Figs. 11, 12 and 13, beginning with a flat portion lying in a plane of the upper surface of the table at the point 142 and gradually increasing in width and depth until the groove reaches an entrance 144 of the orienting unit 143 (Figs. 2, 10 and 14). The unit 143 has guide or controlling walls 145 and 146 respectively which function to assure feeding of the articles or springs 70 between final guides 145 with the projection 136 extending to the left (Fig. 2). The guide wall 145 extends from an angular position 147, similar to the adjacent angular wall of the groove 141 in the chute 140 near the entrance end 144, to a vertical position 148' at an exit end 149 of the unit. Therefore, if the article should lean to the right (Fig. 2) in passing down the chute 140 and remain in this position while entering the unit 143, the article would move into engagement with the guide wall 145 and would be moved from a leaning position to a vertical position due to the contour of the wall. This action on the article during its advancement will turn the article in a rotating motion during its longitudinal advancement, to orient the article and cause it to lie on its other side with the projection 136 located at the left (Fig. 2). The wall 146 extends through a particular arc between the entrance end 144 and the exit end 149, this contour causing an article passing down the chute 140 and leaving toward the left (Fig. 2) to be rocked arcuately on the lower edge thereof so that it will be moved into the control of the guide wall 145. The guides 148 are of the contour illustrated in Figs. 1, 2 and 8, with outwardly curved inner surfaces at their entrance ends and integral outwardly projecting lugs 150 with elongate apertures 151 therein for receiving screws 152, through the aid of which the guides may be secured to a support 153. The support 153 is in the form of a tilted table with integral brackets 154 adapted for mounting on the bearings 107 and 121. The guides 148 accurately direct the articles 70 singly to the belt and locate the articles so that the apertures 135 therein will register with the locating elements 131 positioned between the guides at the time the part is fed thereto. Fig. 8 illustrates more in detail the exit end of the guides which extend across the belt and downwardly to positions close to the belt 133, with grooves 157 in the lower surfaces thereof for the movement of the locating elements 131 relative thereto. The guides also extend to points adjacent a stop 158 rigidly supported by a bracket 159. The stop 158 is grooved at 160 to receive the end of the article 70 and to cooperate with the other feeding means in maintaining the accurate location of the article with respect to the locating elements 131 on the belt which have previously been positioned to receive the article. The stop 158 is also provided with a vertical aperture 161 which functions with the control mechanism illustrated in Figs. 1 and 17.

Briefly, this mechanism includes a light source or lamp 165 which is illuminated during the operation of the machine, a beam of light therefrom projecting through a lens 166 mounted in alignment with the aperture 161 of the stop 158. Positioned beneath the stop and in a housing 167, which is provided for the control mechanism, is a light sensitive unit or phototube 168. With the control mechanism thus described the beam of light projecting through the lens 166 and the aperture 161 are cut off by each article or spring 70 to be fed accurately to the belt 133, and as a result thereof a solenoid 170 is energized to cause operation of the clutch 29 (Fig. 3). For a more specific description of the control means, attention is directed to Fig. 17 as well as to Figs. 1 and 3. In Fig. 17 a simple wiring diagram is illustrated showing supply lines 171 and 172 from a source of energy for the energization of the solenoid 170 and the phototube 168. A transformer 173 is provided in a circuit for the lamp 165, to reduce the voltage satisfactory for the lamp. A circuit for the transformer may be traced from line 171 at connection 174, through a primary winding 175 of the transformer, to line 172 at connection 176. A circuit for the lamp 165 may be traced from connection 177 of secondary winding 178, through the lamp 165 to connection 179 of the secondary winding. A circuit for the phototube 168 may be traced from line 171 at connection 180 through the solenoid 170, contacts 181 and 182 of a stop switch indicated generally at 183, through an electrical unit 185, the phototube 168, back through the unit 185, to line 172 at connection 186. The electrical unit 185 may include various electrical elements, such as vacuum tubes, condensers and resistances, necessary for the controlling of the circuit to the solenoid 170 through the aid of the phototube 168. It is believed that such units are well known and a complete illustration and description thereof are not felt necessary for a clear understanding of the invention.

Attention is now directed to Figs. 1 and 2, which illustrate a transparent cover 190 pivotally supported at 191 to extend over the belt 133 and the guides 148, to make it possible for the operator to view the feeding of the parts singly in place on the belt but to serve as a guard against access to the belt at this position during the operation of the apparatus. Associated with the cover 190 is a spring pressed plunger 192 mounted for longitudinal movement by the force of a spring 193, to effect opening of the contacts 181 and 182 when the cover 190 is swung upwardly about its pivot, an annular abutting member 194 being mounted upon the under surface of the cover and adapted to move the plunger 192 rearwardly to close the contacts and to maintain them closed while the guard is in its normal position. Thus, upon movement of the guard out of its normal position, the circuit including the solenoid 170, the phototube 168 and its unit 185 will be opened by the opening of the contacts 181 and 182.

Upon considering the operation of the apparatus, let it be assumed that a desired number of parts or springs 70 has been fed to the apparatus and that the belt 133 is partially filled with the springs. When in the position shown in Fig. 2, a spring 70 has just been fed down the chute 140, through the unit 143, between the guides 148, and onto the belt, and another spring is in position in the chute 140 to be sent on its way. The moment the first spring, that is the spring shown on the belt adjacent the exit end of the feeding means, has interrupted the light beam passing from the lamp 165 through the lens 166 to the phototube 168, the phototube will function with its associated unit 185 to complete a circuit through the solenoid 170 to effect energization thereof. Upon energization of the solenoid 170 the one-revolution clutch 29 is closed, causing one complete revolution of the shaft 31 with the constantly rotating shaft 27. As a result, the mechanism including the spiral gears 43 and 44, the shaft 45, and the spiral gears 50 and 51 will cause rotation of the cams 53 and 54 one revolution. This mechanism naturally causes operation of the upper portion of the welding machine 25 through the control of the cam 54 which operates in timed relation with the actuation of the feeding means or the mechanism for advancing the conveyor belt 133. It is not meant that the conveyor belt is moved during the welding process but that during the one cycle of rotation of the cams 53 and 54, a portion of this cycle includes operation of the welding machine while another portion thereof includes the advancement of the springs with the belt relative to the welding machine. During downward movement of the upper portion or head 62 of the welding machine including the electrode wheel 63, through the actuation of the lever 55, the cam 33 functions to raise the anvil 40 to position it beneath the spring 70 brought into alignment therewith, after which the wire feeding and cutting mechanism 67 functions to advance the wire a predetermined length and to sever a desired length from the end thereof in the form of the contact 69 which is to be welded on the spring. The welding circuit is not shown, but it is to be understood that such a circuit is provided for the welding machine and a suitable control means may be provided therefor to close the welding circuit after the electrode wheel 63 and the anvil 40 have completed their movements toward each other and supplied the necessary pressure on the spring and contact for the weld, the welding circuit being opened again after a given length of time. The cams 53 and 33 are formed so that the portions of the welding machine under their control may be moved away from each other in sufficient time to allow functioning of the cam.

The cam 54 causes downward movement of the mechanism associated with the cam roller 75 (Fig. 5) against the force of the spring 84, to move the rod 83 and the link 87 downwardly, causing a rocking movement of the ratchet unit 100 to rock the shaft 101 through the engagement of the pawls 102 with the ratchet 105, to advance the belt 133 on the pulleys 124 the distance of one position, that is the distance between the centers of the sets of locating elements 131 and 132. Thus a finished article or spring 70 passes from the belt and into a receptacle 197 (Fig. 3) and a new set of locating elements or pins is positioned at the exit end of the chute 148. At this time the operator may allow the spring 70 shown positioned in the chute 140 to move downwardly to assume its position on the belt. When the spring is allowed to travel downwardly, the operator only has to be sure that the proper end of the spring is in advance and need not determine whether or not the spring is lying upon the correct side. In moving downwardly, the spring will enter the unit 143 and, as shown, the projection 136 is upon the left side. The spring, in passing through the unit 143, will be controlled by the guide walls 145 and 146, which assure location of the spring in the correct position when it enters the chute formed by the guides 148 and the support 153. The wall 146 will cause the spring to rock to a position where it will be under the control of the wall 145, moving the spring from a position leaning toward the left to an angular position in engagement with the wall 145, the latter effecting movement of the spring to a vertical position, the momentum of the spring during the downward travel thereof causing the spring to lie in the proper position as it enters the chute 148. If the spring 70 is placed in the chute 140 so that it will lie on its opposite side with the projection 136 extending to the right, then the spring will be under the complete control of the wall 145, which will raise the spring from a lying down position on one side in the chute 140 to a vertical position, at 148', during its travel through the unit 143, resulting in the turning of the spring so that it will lie on the opposite side from that from which it started its travel. When the spring enters the lower chute in the correct position, it continues its travel between and under the control of the guides 148 until its forward end strikes the inner end of the stop 158. At this time the rearmost end of the spring will be free to drop downwardly, the guides 148 and the stop 158 controlling the spring to cause it to drop so that the control elements 131 will enter the apertures 135 of the spring. The spring is thus located in place and it has broken the ray of light from the lamp 165 to cause functioning of the phototube 168, resulting in the energization of the solenoid 170, the actuation of the clutch 29, and the setting in motion of the mechanism for operating the welding machine and the next advancement of the conveyor belt 133.

With this mechanism it is apparent that the operator is relieved of the necessity of operating the welding machine, the accurate positioning of the springs with respect to the electrode and anvil of the welding machine, and the efforts of reaching for a new spring and the disposal of the welded spring during each cycle of operation of the machine. All that is necessary of the operator is the feeding of the springs down the chute in any desired manner, making sure that the proper end of the spring is advanced to the chute and that there is a sufficient time interval between each advanced spring for the operation of the apparatus and the welding machine. This time interval may be readily recognized through the actuation of the mechanism.

If by accident a spring should be fed to the chute with the wrong end foremost, the ray of light will not be completely interrupted and the control means linked with the phototube 168 will not function. Such a spring may be safely removed manually but in order to do so the cover 190 must be moved upwardly and as a result thereof the plunger 192 is released to effect opening of the switch 183 to the solenoid 170 so that the apparatus and the machine will be rendered inoperative until the spring is removed and the cover again lowered to close the switch. Furthermore, if it is desirable to feed the springs so that they will fall on the reverse side the members of the unit 143 having the respective surfaces 145 and 146 may be reversed and the guides 148 may be adjusted to bring about this result.

Although specific improvements of the invention have been shown and described, it will be understood that they are but illustrative and that various modifications may be made therein without departing from the scope and spirit of this invention as defined by the appended claims.

What is claimed:

1. An apparatus for advancing articles to a machine adapted to perform work thereon, the apparatus comprising an article feeding station, means to direct articles singly to the station, a member movable intermittently relative to the station and the machine to receive the articles at the station and move them to the machine, means for projecting a beam of light at the feeding station, and a light sensitive means under the control of the said beam adapted to cause movement of the member and actuation of the machine at predetermined intervals after each article interrupts the said beam.

2. An apparatus for advancing articles to a machine adapted to perform work thereon, the apparatus comprising means operable to actuate the machine, an endless conveyor having a plurality of spaced article receiving portions, a feeding station disposed adjacent the path of the said portions, means operable to move the conveyor intermittently to position portions thereof adjacent the feeding station and the machine, means to feed an article to the portion of the conveyor disposed at the station, and means affected thereby to render the said operable means effective to respectively actuate the machine and move the conveyor.

3. An apparatus for advancing articles to a machine adapted to perform work thereon, the apparatus comprising means operable to actuate the machine, an endless conveyor having a plurality of spaced article receiving portions, a feeding station disposed adjacent the path of the said portions, means operable to move the conveyor intermittently to position portions thereof adjacent the feeding station and the machine, means to feed an article to the portion of the conveyor disposed at the station, and means affected thereby to render the said operable means effective to respectively actuate the machine and move the conveyor at different intervals of time.

4. An apparatus for advancing articles to a machine adapted to perform work thereon, the apparatus comprising means operable to actuate the machine, an endless conveyor having a plurality of spaced article receiving portions, a feeding station disposed adjacent the path of the said portions to successively direct articles to the portions, means operable to move the conveyor intermittently to position portions thereof adjacent the feeding station and the machine, means for projecting a beam of light, at the feeding station, which will be interrupted by properly positioned articles on the portions, means to feed articles successively to the portions of the conveyor disposed at the station, and a light sensitive means under the control of the beam to render the said operable means effective to respectively actuate the machine and move the conveyor after each article interrupts the beam of light.

5. An apparatus for advancing articles to a machine adapted to perform work thereon, the apparatus comprising a power driving means, a driven means adapted for operative connection with the power means to actuate the machine, a movable member having a plurality of article receiving portions, a driven means adapted for operative connection with the power means to move the conveyor, means to feed an article to a portion of the conveyor, and means responsive to the feeding of the article to the member to cause operative connection of the driven means with the power means to cause actuation of the machine and movement of the member at different time intervals.

6. An apparatus for advancing metallic articles to a welding machine adapted for operation to singly weld parts to the articles, the apparatus comprising an article feeding station, means to direct articles singly to the station, a member movable intermittently relative to the station and the machine to receive the articles at the station and move them to the machine, and a control unit including a lamp adapted to project a beam of light in a path intersected by the articles when received at the station, a light sensitive element under the control of the said beam adapted to cause movement of the member and actuation of the machine at predetermined intervals after each article received at the station interrupts the said beam.

7. An apparatus for advancing articles to a machine, having relatively movable article working members, actuable to perform work on the articles, the apparatus comprising means to actuate the machine, an endless conveyor having a plurality of spaced article receiving portions to singly receive and support the articles so that end portions thereof will extend beyond the conveyor, a feeding station disposed adjacent the path of the said portions, means operable to move the conveyor the distance between the receiving portions to successively position the receiving portions of the conveyor adjacent the feeding station and the end portions of the articles between the said article working members, means disposed at one side of the conveyor for projecting a beam of light at the feeding station, means to feed an article to the position on the conveyor disposed at the receiving station, light sensitive means under the control of the beam, and means rendered effective thereby upon the interruption of the beam to render the actuable means effective to cause relative movement of the article working members and at a different interval of time render the operable means effective to move the conveyor.

BERIL EDELMAN.
ALBERT L. PIZZI.